Dec. 16, 1930.  C. W. DAKE  1,785,183
BRUSH HOLDER FOR ELECTRICAL MACHINES
Filed Oct. 15, 1926  2 Sheets-Sheet 1
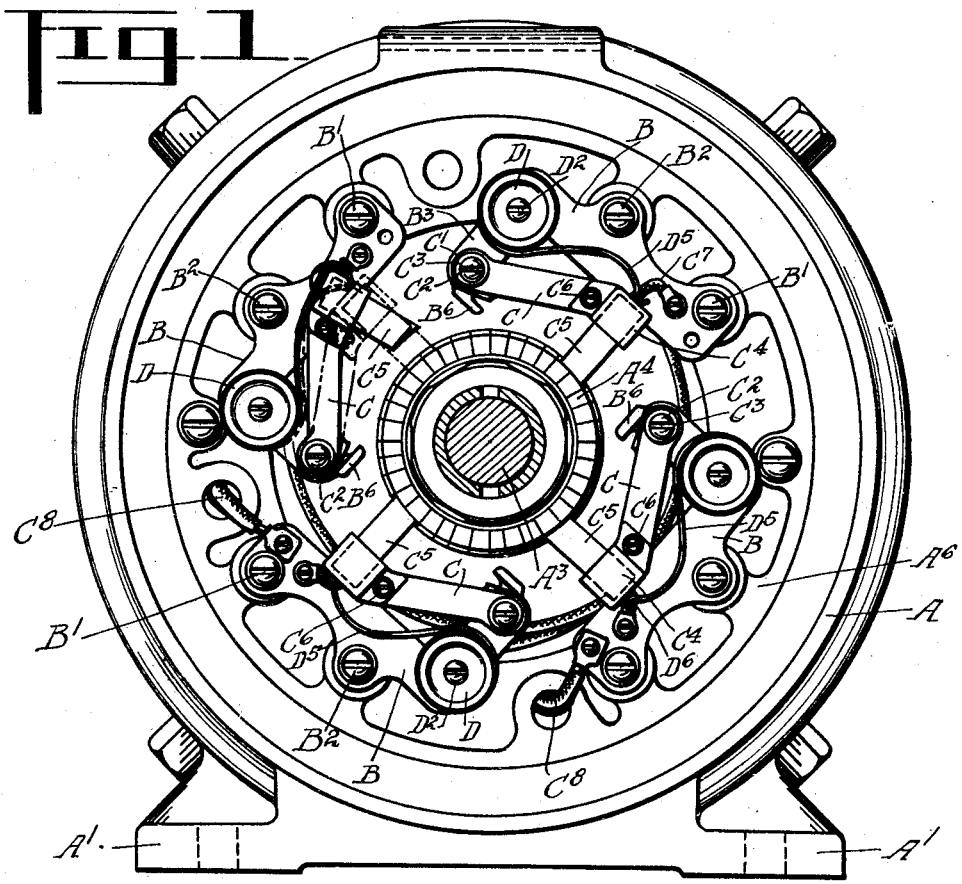
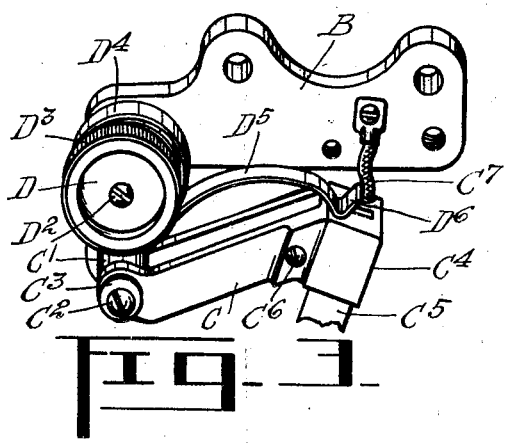
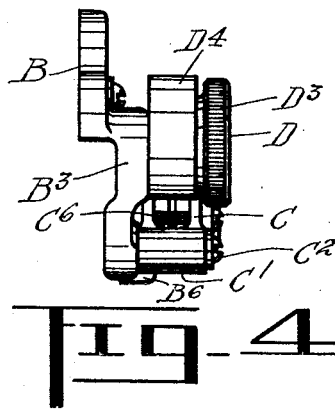
INVENTOR
Charles W. Dake
BY
ATTORNEY Dec. 16, 1930.  C. W. DAKE  1,785,183
BRUSH HOLDER FOR ELECTRICAL MACHINES
Filed Oct. 15, 1926    2 Sheets-Sheet 2
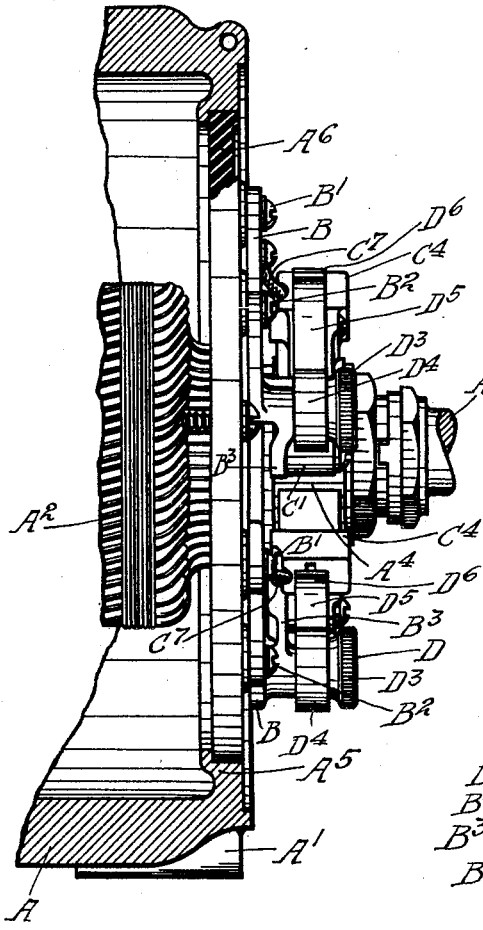
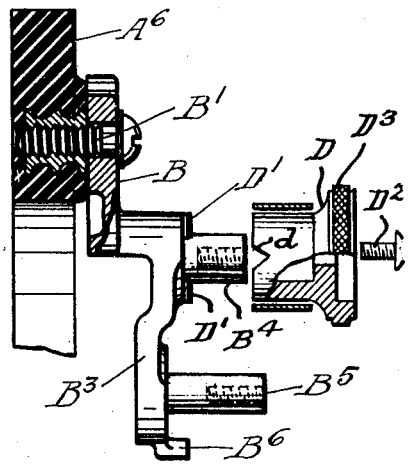
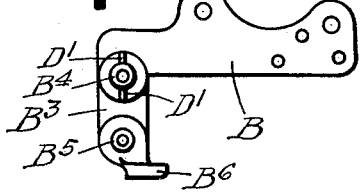
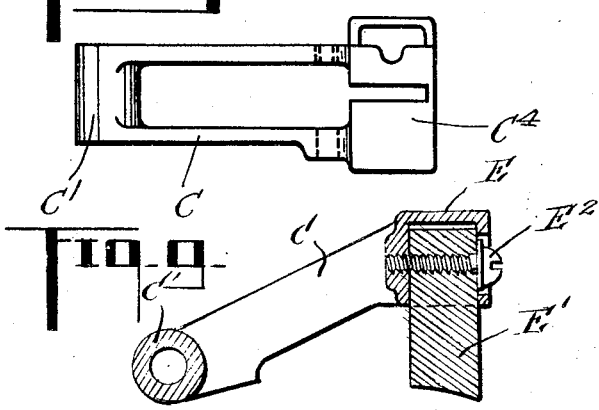
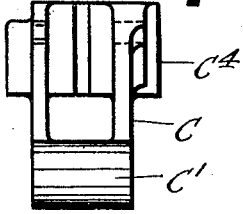
INVENTOR
Charles W. Dake
BY
ATTORNEY Patented Dec. 16, 1930

1,785,183

UNITED STATES PATENT OFFICE

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY

BRUSH HOLDER FOR ELECTRICAL MACHINES

Application filed October 15, 1926. Serial No. 141,765.

My invention relates to a new and improved type of brush holder for electric machines, such as generators, motors and the like, and has for one object to provide a holder whereby the brush may be adjusted toward and from the commutator, whereby the brush may be easily and conveniently removably held, whereby an adjustable spring pressure of the brush against the commutator may be provided, and whereby the movement of the holder toward the commutator as the brush wears may be held within safe limits. Other objects will appear from time to time in the course of the specification.
I illustrate my invention more or less diagrammatically in the accompanying drawings, wherein Figure 1 is an end view of a generator with the shaft in section, showing the brush holders in place;

Figure 2 is a longitudinal section through the generator, showing the brush holders;

Figure 3 is a perspective view of the brush holder itself;
Figure 4 is a side elevation of the brush holder viewed from the left of Fig. 3;

Figure 5 is a section through the supporting plate;

Figure 6 is a plan view of the brush-holding arm;

Figure 7 is an end view of the brush-holding arm viewed from the left in Fig. 6;

Figure 8 is a side elevation of the brush-holding plate;
Figure 9 is a section through the brush-holding arm showing the brush in place.

Like parts are indicated by like figures throughout the specification and drawings.

A is a generator housing having support-ings legs or feet $A^1$. $A^2$ is the armature, $A^3$ the shaft, $A^4$ the commutator. The housing A is inwardly flanged as at $A^5$ and contains the insulating brush-holding ring $A^6$ bolted in place.
B is the brush-holding plate. It is held on the ring $A^6$ by the screws $B^1$ $B^2$, there being two or more of these brush-holding plates, all identical, so the description of one suffices for all. The brush-holding plate is provided with a laterally and outwardly extended arm $B^3$. From this arm project pivot pins $B^4$ $B^5$, and the arm terminates in a stop lug $B^6$ adjacent the pin $B^5$. Each of these pins is interiorly threaded.

Rotatable on the pin $B^5$ is a brush arm C, comprising a sleeve $C^1$ to engage the pin $B^5$ and adapt it to be held thereon by a screw $C^2$ and washer $C^3$. This arm terminates in a socket $C^4$ split throughout most of its length. $C^5$ is the brush engaged in the socket and clamped therein by means of the screw $C^6$, which extends across between the two parts of the arm and draws them and the two parts of the brush socket together to grip the brush. This brush is at generally right angles to the arm, to engage the commutator. $C^7$ is a conducting lead extending from the brush to the plate B, where it is grounded. $C^8$ is a conductor leading from a connection to the plate B out to the usual type of conductor ring, not herein shown.

D is a tension drum rotatably mounted on the pin $B^4$: The base of this drum is slotted or formed with V notches $d$, Fig. 5, adapted to engage the lugs $D^1$ disposed radially with respect to the ring $B^4$. The screw $D^2$, interiorly threaded in the pin $B^4$, holds the tension drum in register with the lugs against removement. When this screw is backed off the knurled portion $D^3$ on the drum may be held by the operator in order to rotate the drum, to increase the spring tension. $D^4$ is a flat coil spring wound around the tension drum and dead-headed thereon, having a brush-holding arm $D^5$ extending laterally and bent as at $D^6$ to engage the rear end of the brush arm. Rotation of the drum in a clockwise direction, as in Fig. 3, increases the tension on the spring. Rotation in the opposite direction decreases the tension. The stop $B^6$ lies in the path of the arm C, so that as the brush wears and the arm moves down toward the commutator the stop is engaged by the arm before the brush has worn far enough to bring the arm itself or the brush socket against the commutator, and thereby damage to the commutator is effectually prevented.

In the modified form shown in Fig. 9, in general the same type of brush arm is used, except that in this case the socket E just fits the base of the brush E¹ and a holding screw E² passes through the wall of the socket and the brush and is threaded in the other wall of the socket so this screw holds the brush in place without constricting the brush-holding arm.

I claim:

1. In a brush holder, a supporting plate, pins projecting therefrom, a brush holding arm pivoted on one pin, a brush carried by the arm, a tension member rotatable on the other pin, an arm projecting from the tension member engaging the free end of the brush holding arm and means for adjusting the tension therein, said means comprising a drum, a spring wound about the drum and interposed between it and the tension arm and means for locking the drum in adjusted position.

2. A brush holder for electric machines and the like comprising a plate, a fixed arm projecting therefrom, a pivot pin projecting from the arm perpendicular to the plane of the plate, a brush holder pivoted on the pin, a tension member rotatable on the arm and a spring finger projecting therefrom to engage the free end of the brush holder.

3. A brush holder for electric machines and the like comprising a plate, a fixed arm projecting therefrom, a pivot pin projecting from the arm perpendicular to the plane of the plate, a brush holder pivoted on the pin, a tension member rotatable on the arm and a spring finger projecting therefrom to engage the free end of the brush holder, the tension member comprising a drum, a spring wound about it, the end of the spring forming a tension finger.

4. A brush holder for electric machines and the like comprising a plate, a fixed arm projecting therefrom, a pivot pin projecting from the arm perpendicular to the plane of the plate, a brush holder pivoted on the pin, a tension member rotatable on the arm and a spring finger projecting therefrom to engage the free end of the brush holder, the tension member comprising a drum, a spring wound about it, the end of the spring forming a tension finger, interlocking members on the plate and drum whereby the drum may be held in adjusted position, means for releasing the drum to permit adjusting rotation.

5. A brush holder comprising a flat plate, a lug projecting laterally from one edge thereof, an arm projecting from the lug parallel with but in a different plane from the plate, pivot pins projecting from the lug and from the end of the arm perpendicular to the end of the plate, a brush holder pivotally mounted on the pin on the arm, a tension member on the pin projecting from the lug engaging the free end of the brush holder.

6. A brush support for electric machines, comprising a plate, a pair of pivot pins projecting from the plate, a brush, a socket in which the brush is removably but rigidly held, an arm associated with the ring and mounted for rotation on one of the pins, a tension drum rotatably mounted on the other pin, a spring projecting from the drum engaging the arm, and means for adjustably rotating the drum to control the tension of the spring on the brush carrying arm, a stop associated with the brush pivot to limit the movement of the arm toward the commutator.

7. A brush support for electric machines and the like, a plate, a finger integral with the plate projecting inwardly toward the commutator of the machine, a pair of pivot pins projecting from the plate at right angles to the plane thereof, one of them mounted on the finger, the other mounted on the plate at the intersection of the axial line of the finger and plate, an arm pivotally mounted on the pin carried by the finger, a brush removably socketed in the arm adapted to engage the commutator, a flexible electric connection between the brush and the plate, a tension drum mounted for rotation on the other pivot finger, a spring arm projecting from the tension drum, engaging the free end of the brush supporting arm, the tension drum being rotatable to adjust the tension of the spring and means for locking it in adjusted position, the locking means comprising a notch in the face of the drum, a lug on the plate and a screw adapted when tightened to force the notch and lug into engagement to hold the drum in position and loosened to permit the drum to rotate freely on the pin.

Signed at Chicago, county of Cook, and State of Illinois, this 13th day of October, 1926.

CHARLES W. DAKE.